United States Patent Office 3,271,350
Patented Sept. 6, 1966

3,271,350
EPOXY RESIN COMPOSITION COMPRISING (1) PARTIAL REACTION PRODUCT OF EPOXY RESIN AND GUANAMINE AND (2) UNREACTED EPOXY RESIN
Leonard R. Vertnik, Minneapolis, Minn., assignor to General Mills, Inc., a corporation of Delaware
No Drawing. Filed May 28, 1963, Ser. No. 283,713
20 Claims. (Cl. 260—32.8)

The present invention relates to novel epoxy resin compositions and to the process of preparing said compositions. It also relates to the use of such compositions for the impregnation of fibrous materials and to the resulting impregnated fibrous materials.

Filament winding has recently come into importance through its use in the military field for winding of the motor cases of missiles. By filament winding is meant a process in which fiber glass roving is impregnated with a resin-curing agent combination and the impregnated roving wound in specific patterns over a mandrel or other mold form and cured to give the desired structure. The main advantage of this system over a steel-formed structure is the higher strength to weight ratio of resin-bound glass over steel. Other advantages such as non-rusting, ease of fabrication and less expensive tooling costs are also important.

Most of the strength of a filament wound structure comes from the glass fibers, not from the resin system. The purpose of the resin is to act as a binder for the glass roving to provide an integral structure and to spread applied forces so as to minimize localized stresses. A resin system with satisfactory elongation, heat deflection temperature and tensile properties will be able to stretch with the glass to share the load, allowing the fibers to become oriented and thereby survive higher stresses.

Practically all of the presently available resin-curing agent systems used for glass fiber filament winding are of the wet lay-up type, i.e., they are simple mixtures of epoxy resins and curing agents. The glass fiber roving is dipped into the mixture and the resulting impregnated roving must then be wound almost immediately. The greatest disadvantage of such resin systems is that they have practically no shelf life and thus must ordinarily be used within a few hours after the epoxy resin and curing agent are mixed. Weighing and mixing equipment are also required at the location of the user which entails extra expense and the possibility of obtaining resin-curing agent systems which are not homogeneous or which contain incorrect proportions of the reactants. Furthermore, the wet lay-up technique is inherently messy, requiring time consuming clean-up operations. Limited winding speed is usually necessary because of the risk of throwing resin off the mandrel at high rotation speeds. Additionally, low resin content cannot be obtained on large diameter parts because of the inability to obtain high enough tension during the winding operation and non-uniform structures may result due to the migration of the resin-curing agent system during the winding and/or curing. Also liquid epoxies are normally required since the higher molecular weight resins are too viscous to provide satisfactory wetting action unless worked hot. Solvents can be used for the higher molecular weight resins only with difficulty because of the problems of solvent removal.

It would be highly desirable to provide an epoxy resin-curing agent system which would alleviate all or a substantial portion of the problems discussed above with respect to the wet lay-up resins. One method of avoiding a part of the described problems is to employ curing agents which can be mixed with the resins without any significant reaction taking place at room temperature even after extended periods of storage. Such systems may or may not be homogeneous since there is a mere physical admixture of the curing agent and the epoxy resin. Also, in many cases the curing reaction is extremely slow requiring an excessive amount of time or the addition of catalysts. In other instances, the epoxy resin and curing agent react violently upon reaching the threshold curing temperature making it difficult, if not impossible, to control the reaction. Such violent reaction results in loss of material, poor flow and defective filament wound structures.

One way to overcome the lack of homogeneity of the epoxy resin-curing agent systems is to employ a partially reacted or B-stage resin. However, the vast majority of known epoxy resin-curing agent systems cannot be "B staged" because the materials are either reactive at room temperature or proceed to complete cure when the threshold curing temperature is reached. A few such partially cured resins have, however, been prepared. Most of these possess various disadvantages. Thus some of these "B stage" resins, while stable for varying periods of time, are not sufficiently stable or do not have a sufficiently long life and cure too rapidly at elevated temperatures. Other such resins are so extremely slow in reacting that catalysts are required to accelerate reaction in forming the "B stage" resins as well as in effecting final curing.

Recently "B stage" resins have been prepared from epoxy resins and certain guanamines. These resins are one-package, curable compositions which are homogeneous and stable for extended periods of time at room temperature or slightly elevated temperatures and yet will cure in a reasonable time at high temperatures. No accelerators or catalysts are required in the preparation of such resins or in the final curing thereof and the final curing can be effected without violent reaction. Also, both liquid and solid epoxy resins can be employed in the preparation of such resins. While these "B stage" resins alleviate most of the above-described problems connected with filament winding, they ordinarily do not provide sufficient tack to the impregnated roving. Thus, the impregnated roving should stick to itself when being wound on a mandrel to form the desired object but should not have so much tack that it cannot be unwound readily after being stored on a spool.

I have now discovered that stable, curable compositions which provide the desired tackiness to glass fibers impregnated therewith can be prepared by first partially reacting a portion of the epoxy resin with a guanamine curing agent and then adding the rest of the epoxy resin to the partial reaction product. This addition of the rest of the epoxy resin is preferably made at the time that the reaction of the major proportion of the epoxy resin and guanamine is terminated. Such addition also provides the advantage of cooling the "B stage" or partial reaction product quickly, thus aiding in the control of the reaction. The novel compositions of my invention are particularly suitable for the impregnation of fiber glass rovings. The resulting impregnated fiber glass rovings are outstandingly useful in the preparation of structures and objects using filament winding techniques.

It is, therefore, an object of this invention to provide novel compositions of matter prepared from epoxy resins and guanamines.

Another object of this invention is to provide such compositions which are particularly suitable for the impregnation of glass fiber rovings.

It is also an object of the present invention to provide novel compositions comprising fibrous materials impregnated with the new compositions of matter prepared from epoxy resins and guanamines.

A further object of my invention is to provide a novel method for preparing new compositions of matter from epoxy resins and guanamines.

These and other objects will become apparent from the following detailed description.

A wide variety of guanamines may be employed in the preparation of the compositions of the present invention. They may be represented by the following formulae:

(A)
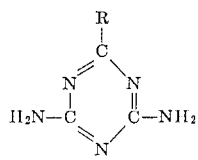

(B)
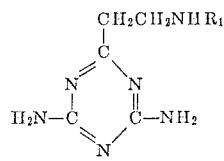

(C)
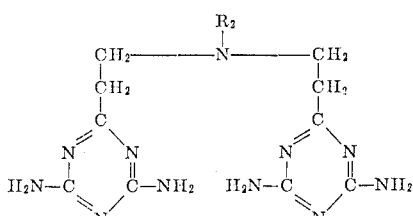

(D)
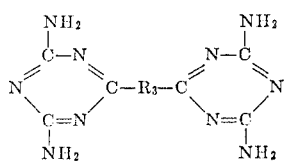

where R is phenyl or an aliphatic hydrocarbon group containing from 4 to about 21 carbon atoms, $R_1$ and $R_2$ are aliphatic hydrocarbon groups containing from 4 to about 21 carbon atoms and $R_3$ is a divalent hydrocarbon group containing from 4 to 42 carbon atoms. The aliphatic hydrocarbon groups, R, $R_1$ and $R_2$, preferably contain 6 to 21 carbon atoms. $R_3$ is preferably the divalent hydrocarbon radical of a dimerized fat acid derived from a fat acid of 8 to 22 carbon atoms.

The foregoing guanamine compounds may be defined generally by the following formula:

$$(A)_xB$$

where A is the ring

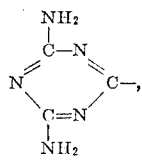

$x$ is an integer of 1 to 2 and B is selected from the group consisting of R, $R_1NHCH_2CH_2$—, $R_2N(CH_2CH_2$—$)_2$ and $R_3$ where R, $R_1$, $R_2$ and $R_3$ have the meanings set forth above.

These guanamines are conveniently made from dicyandiamide and nitriles. Thus, the aliphatic substituted guanamines may be prepared from aliphatic nitriles such as those derived from the fatty acids, cyclohexanoic acid and the like. Compound B may be made from the amino-nitrile, $R_1NHCH_2CH_2CN$, which is the acrylonitrile adduct with the amine $R_1NH_2$. Compound C may be made from the acrylonitrile diadduct of the amine $R_2NH_2$, $R_2N(CH_2CH_2CN)_2$. Compound D may be made from the dinitrile prepared from an aliphatic dicarboxylic acid such as adipic, pimelic, sebacic and the like or dimerized fatty acids such as linoleic acid. Thus, the guanamines may be prepared from the aliphatic acids containing from 5 to 22 carbon atoms, or the polymerized derivatives of the fatty acids of such carbon content, by converting the acids to the nitriles and then reacting the nitriles with dicyandiamide. The acid employed may be a single isolated acid or may be the mixed acids from a fat or oil or any selected fraction of such fatty acids. Moreover, the acids may be either saturated or unsaturated. Branched chain guanamines are also included. The guanamines derived from the $C_8$ to $C_{18}$ acids of coconut oil are referred to as cocoguanamines.

Various methods of preparing the above-described guanamines are known in the art. Thus, see the following U.S. patents, 2,447,175, 2,459,397, 2,606,904, 2,684,366, 2,777,848, 2,792,395, and 2,900,367.

Any epoxy resin can be used in the present invention. Such resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is in the reaction product of epichlorohydrin and 2,2-bis(p-hydroxyphenyl) propane (bisphenol A), the resin having the following theoretical structural formula:

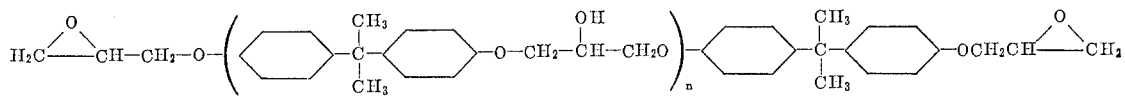

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

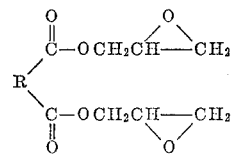

where R is the divalent hydrocarbon radical of dimerized unsaturated fatty acids.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticia, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 8 to 22 carbon atoms. Illustrative thereof are oleic, linolenic, palmitoleic, and the like.

Other types of epoxy resins which may be used in the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxyphenyl) alkanes, such as 1,1,2,2-tetrakis (hydroxyphenyl) ethane, 1,1,4,4-tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

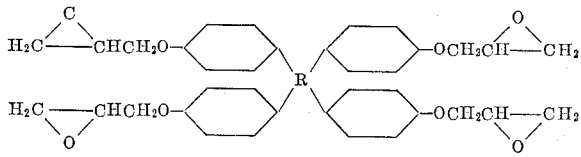

where R is a tetravalent aliphatic hydrocarbon chain having from 2 to 10, and preferably, from 2 to 6 carbon atoms.

Still another group of epoxide materials are the novolac epoxy resins. Such resins are well-known substances and readily available commercially. The resins may be represented by the following theoretical, idealized formula:

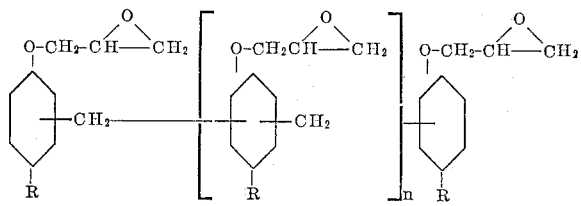

where R is selected from the group consisting of hydrogen and alkyl groups having up to 18 carbon atoms, and $n$ is an integer of from 1 to 5. In general, $n$ will be an integer in excess of 1 to about 3.

In general, these resins are obtained by reaction of epichlorohydrin with the well-known novolac resins. The novolac resins, as is known in the art, are produced by condensing the phenol with an aldehyde in the presence of an acid catalyst. Although novolac resins from formaldehyde are generally employed, novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the paracarbon atom of the parent phenolic nucleus. However, novolac resins in which the alkyl group is in the ortho position have been prepared.

The novolac epoxy resin is formed in the well-known manner by adding the novolac resins to the epichlorohydrin and then adding an alkali metal hydroxide to the mixture so as to effect the desired condensation reaction.

In addition, other epoxy resins which may be used to prepare the compositions of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

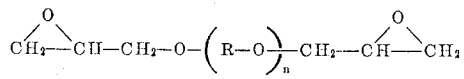

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

While all of the above-described guanamines and epoxy resins can be used in the process of the present invention, it is understood that the particular reactants employed will depend somewhat on the properties desired in my new compositions and the properties desired in the finally cured products prepared from my compositions. Various mixtures of guanamines can be used as well as mixtures of epoxy resins to provide products having desired properties such as high tensile strength, high elongation, high heat deflection temperatures and the like. For filament winding of impregnated glass fiber rovings, it is preferred to employ mixtures of epoxy-novolac resins and epoxy resins prepared from epichlorohydrin and polyhydric phenols such as Bisphenol A and the tetraphenols.

The guanamine is employed in an amount sufficient to cure the epoxy resin to an insoluble and infusible polymer. Generally, said guanamines are used in ratios by weight guanamine to epoxy resin of from about 5:95 to 75:25 and preferably from about 10:90 to 25:75.

As indicated above, the compoistions of the present invention are prepared by reacting a major proportion of epoxy resin and the guanamine to effect partial curing and stopping such curing before the "C stage" is reached. The resulting partially cured resin is then admixed with the remainder of the epoxy resin to provide the novel compositions of the present invention. The partial curing can be effected at various temperatures. At higher temperatures, the time of heating becomes short for producing the partially cured resin and care must be taken that the time is not sufficiently extended so as to result in the finally cured or insoluble and infusible polymer. At lower temperatures, the heating period is slightly longer and more control can be exercised. As a practical matter, the epoxy resin-guanamine system will generally be partially reacted at temperatures in the range of about 100 to 210° C. Preferably the reaction is conducted at temperatures of about 120 to 180° C. Reaction temperatures of about 140 to 160° are even more preferred.

The period of heating required to produce the desired partial reaction product will vary somewhat depending upon the particular epoxy resin(s) and guanamine(s) employed and the reaction temperature. Normally, the partial reaction time can be expected to be in the range of a few minutes to 90 minutes or more. It is, of course, most important that the reaction not be carried out to the point where gellation occurs. One means of avoiding gelation, which can be used during the heating period, is determination of the viscosity of the product. Another is to determine the oxirane oxygen content periodically and observe the rate of change thereof.

In observing the change in viscosity during heating, it is noted that very little change occurs during the initial heating period. As heating is continued, the rate of change in viscosity begins to increase somewhat and just prior to gelation the viscosity increases very rapidly. When the viscosity begins to increase greatly, heating is discontinued and the product cooled quickly before gelation occurs.

In determining oxirane oxygen content, resin samples are withdrawn from the batch periodically, cooled rapidly, and dissolved in acetic acid. The solution is titrated with HBr to the end point (crystal violet). Since HBr titrates both the oxirane oxygen of the epoxy resin and the amine of the guanamine, mercuric acetate solution is then added and the solution is tatrated to the same end point as before. The difference between the two titrations represents the actual oxirane oxygen content of the sample.

Thus in the first step of my process the major proportion of the epoxy resin is reacted with the guanamine at a temperature sufficient to effect partial cure, for example at about 100 to 210° C., and preferably at 120 to 180° C. Thereafter heating is discontinued and the reaction mixture is cooled before an insoluble and infusible polymer results. In general the reaction is terminated when about 5 to 90% complete. When compositions for use in preparing filament wound structures are desired, the reaction is preferably terminated when about 5 to 25% complete.

In the second step of my process, the remainder of the epoxy resin is added to the partial reaction product as above-described. Preferably, this addition is made at the time the partial reaction is terminated and thus aids in the cooling of the partial reaction product. The amount of the total epoxy resin withheld and then added in the second step can vary widely. Thus from about 5 to 50% by weight of the total epoxy resin can be added to the partial reaction product prepared in the first step of my process. Preferably, about 5 to 30% is added. When compositions for use in preparing filament wound structures are desired, it is preferred to add about 10 to 20% of the total epoxy resin in the second step of the process. It is also preferred that a normally liquid epoxy resin be used for this addition to the partial reaction product.

The novel compositions of the present invention have a wide variety of uses. Thus they can be used as adhesives, coatings, solders, molding compounds and laminating resins. In this respect, it is to be understood that not all of the compositions are equivalent for any particular use. The compositions will range from relatively viscous liquids to brittle solids and the finally cured products prepared therefrom will vary from soft, pliable flexible solids to hard, brittle solids. Various addition agents can be included in the compositions, such as solvents, fillers, dyes, pigments and the like.

The compositions are particularly useful for the impregnation of fibrous materials, especially for fiber glass rovings used to prepare structures and objects by filament winding techniques. By fibrous material is meant individual fibers or monofils, rovings, yarns, mats, fabrics, wood sheets, mica and the like. Such materials include the natural or artificial textile mateirals, such as cotton, linen, natural and artificial silks, jute, hemp, sisal, rayon, animal fibers such as wool, hair, mohair, synthetic fibers including the fibers from polyesters such as for example the ethylene glycol tetraphthalic acid polyesters (Dacron), the acrylic polyvinyls, such as for example the acrylonitrile polymers (Orlon), the polyethylenes, polyurethanes, mineral fibers (fiber glass), polyamides and the like.

The fibrous materials can be impregnated by my compoistions in a variety of ways. Preferably, the compositions are dissolved in a solvent (at for example, 25 to 75% solids), such as the mono methyl, ethyl or butyl ethers of ethylene glycol, methyl ethyl ketone, acetone, trichloroethylene, mixtures thereof and the like. The fibrous material can then be dipped into or pulled through such solution and excess solvent removed by vaporization, drying and the like. Where the compositions have a low viscosity, they can be used directly and without the addition of a solvent. The novel compositions and solutions are stable for extended periods of time at room temperature and thus can be stored as such for later use. The impregnated fibrous materials are also stable for extended periods of time at room temperature and therefore can be prepared well in advance of use. And as previously indicated, the present invention makes it possible to provide impregnated fiber glass rovings with suitable tack for use in preparing filament wound structures and objects.

Laminates may be prepared from the impregnated fibrous materials of my invention by conventional procedures. Thus, matched metal dies or platens pressed together mechanically and heated can be used. Both the laminating pressure and temperature can vary over wide limits. Pressures of a few to several hundred pounds per square inch may be used and the temperatures can vary from as low as about 100° C. to 400° C. and higher. Such laminates can be used in the aircraft industry as structural sheeting in ducts, radomes, tail sections and elevators and as materials for lightweight honeycomb sections. They can also be used in electrical switch gears, instrumental panels, high-performance moisture-resistant printed circuit bases, electrical-coil insulation, low pressure bearing surfaces and specialized applications throughout industry.

The impregnated glass fiber rovings can be used to prepare filament wound structures by conventional techniques. Since they are stable, they can be prepared well in advance of the filament winding operation, can be tailored to the ultimate users specifications as to properties desired in the final structure, and eliminate the weighing, mixing and mess connected with wet lay-up techniques. The resin to glass ratio can be carefully controlled and the resin content will generally be within the range of 12 to 25% by weight of the final structure. The impregnated roving can be wound easily on the mandrel or other mold form and can be cured at temperatures of the order of 100 to 400° C. in relatively short periods of time to give maximum physical properties to the wound structure. Military applications for such structures include motor cases for missiles, radomes, satellite launchers, exit cones, buoys, tanks and submarines. Non-military uses for such wound structures include pressure vessels, reactors, gas cylinders, ducts, pipes, light poles, springs and the like. Other uses will become immediately apparent to those skilled in the art.

The following epoxy resins and guanamines were used in the preparation of the compositions and impregnated fibrous materials of the examples which follow, said examples serving to further illustrate the invention:

*Epoxy resin A.*—A condensation product of Bisphenol A and epichlorohydrin having an epoxy equivalent weight of about 190.

*Epoxy resin B.*—A mixture of isomers and homologues of the tetraglycidyl ether of tetraphenyl ethane prepared by reacting tetraphenol ethane with epichlorohydrin. The polyepoxide has a softening point of 80° C., average epoxy equivalent weight of 200 to 220, a total maximum chlorine content of 1% and a molecular weight of about 700.

*Epoxy resin C.*—An epoxidized novolac resin wherein R in the general formula described hereinabove is hydrogen prepared by reacting a phenol-formaldehyde resin with epichlorohydrin. The resin has an epoxy equivalent-weight of from 175 to 182, a specific gravity of 1.22 and a viscosity at 125° F. of 30,000–90,000 cps.

*Epoxy resin D.*—An epoxy resin prepared by reacting an ortho-cresol formaldehyde novolac resin with epichlorohydrin having the following idealized structural formula:

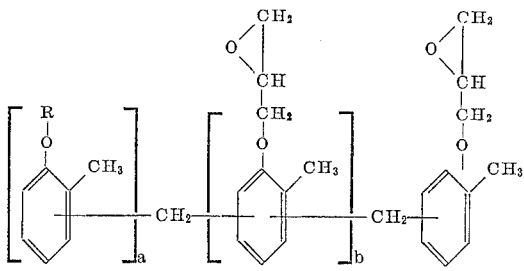

where $a$ is an integer of about 1.6, $b$ is an integer of about 4.4 and R represents chlorohydrins, glycols, and polymeric ethers. The epoxy resin has an approximate molecular weight of 1270, a softening point of 99 and an epoxy equivalent weight of about 235.

*Epoxy resin E.*—An epoxy resin prepared by reacting epichlorohydrin with trihydroxydiphenol having the following idealized structural formula:

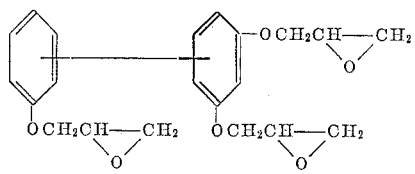

The epoxy resin has an average molecular weight of 413, an epoxy equivalent weight of about 144, a specific gravity of 1.25 and an oxirane oxygen content of 11.1%.

*Guanamine A.*—A guanamine of the general Formula A set forth hereinabove wherein R is phenyl.

*Guanamine B.*—A guanamine of the general Formula A set forth hereinabove wherein R is a $C_{11}$ alkyl group. Said guanamine was prepared from dicyandiamide and a $C_{12}$ nitrile, the latter being derived from the $C_{12}$ fraction of coconut oil acids.

In the examples to follow, all parts are by weight unless otherwise indicated.

*Example I*

To a 1000 ml. beaker equipped with a stirrer, thermometer, and temperature controller were charged 180 parts epoxy resin C and 90 parts epoxy resin A. The resins were heated with stirring to 175° C., the heat shut off and 33 parts guanamine A added gradually with stirring to dissolve the guanamine. The reaction mixture was stirred for 20 minutes at 150–155° C., cooling was begun and then 20 parts of epoxy resin C and 10 parts of epoxy resin A were added to the partial reaction product. The oxirane oxygen content of the final composition was 8.06% while that of the initial reaction mixture was 8.79%. A portion of the viscous resin product was poured into heat deflection tubes which were then placed in an oven at 300° F. for 16 hours. The cured product had a heat deflection temperature (HDT) of 165 (ASTM–D–648–56), a tensile strength of 11,961 p.s.i. (ASTM–D–638–60T) and percent elongation of 7.0 (ASTM–D–638–60T—the HDT bars were necked down to ⅜″ diameter by 2″ long and tested at a rate of pull of 0.05″ per minute).

*Example II*

A portion of the composition prepared in Example I was diluted with 75:25 by weight mixture of methyl ethyl ketone and methyl Cellosolve to give a solution having a solids content of 50% by weight. Glass roving (Owens Corning HTS–E) was impregnated with this solution to give an impregnated roving containing about 40% by weight resin and less than 1% by weight volatiles after drying. The roving had a tack of 8–33 after being stored at room temperature (about 75° F.) for 7 days. The tack was measured by the Rolling Ball Tack Test of the Rocketdyne Division of North American Aviation, Inc. Results are based on a 8 inch elevation at start of roll (1st digit) and distance of roll on a horizontal plane over impregnated roving (2nd two digits). The tack of the impregnated roving of this example was very good making such roving highly useful for filament winding. The tack after 3 months storage at room temperature was still an excellent 8–38.

*Examples III and IV*

Examples I and II were repeated except that 29.7 parts and 36.3 parts of guanamine A were used in Examples III and IV respectively. Results are set forth in the following Table I:

TABLE I

| | Example III | Example IV |
|---|---|---|
| HDT | 167 | 168 |
| Tensile Strength (p.s.i.) | 12,950 | 13,498 |
| Percent Elongation | 7.0 | 8.1 |
| Tack (roving stored 3 days at room temperature) | 8–21 | 8–29 |

The above data indicates that the amount of guanamine can be varied considerably and there is still obtained compositions which have excellent properties for the preparation of filament wound structures.

*Example V*

To a 1000 ml. beaker equipped with a stirrer, thermometer and temperature controller were charged 270 parts epoxy resin C and 90 parts epoxy resin B. The resins were heated to 145° C. with stirring and then 60 parts guanamine B was added gradually. Heating was continued for 10 minutes at 145° C., 40 parts epoxy resin A was added with stirring and the composition cooled to room temperature. A portion of the viscous resin product was poured into heat deflection tubes which were then placed in an oven at 300° F. for 16 hours. The cured product had a heat deflection temperature (HDT) of 162, a tensile strength of 13,345 p.s.i. and percent elongation of 8.8.

Example VI

A portion of the composition prepared in Example V was diluted with a 75:25 by weight mixture of methyl ethyl ketone and methyl Cellosolve to give a 50% by weight solids solution. Glass roving (Owens Corning HTS-E) was impregnated with this solution to give an impregnated roving containing 29.9% resin and less than 1% volatiles after drying. The impregnated roving had a tack of 8–36 (measured as in Example II) after storage for 3 days at ambient room temperature.

Example VII

Example V was repeated except that 90 parts epoxy resin D was used in place of epoxy resin B and guanamine B was replaced by 40 parts of guanamine A. A cured product prepared as in Example V from the resulting partially reacted product had a heat deflection temperature (HDT) of 170, a tensile strength of 9,808 p.s.i. and a percent elongation of 6.3. An impregnated glass roving prepared as in Example VI showed good tack after storage at room temperature for three days.

Example VIII

To a 1000 ml. beaker equipped with a stirrer, thermometer and temperature controller were charged 100 parts epoxy resin A, 100 parts epoxy resin C and 100 parts epoxy resin E. The resins were heated at 175° C., the heat shut off and 44 parts guanamine A added with stirring. The reaction mixture was then held at 145° C. for 10 minutes, followed by the addition of 100 parts epoxy resin B and cooling. When a portion of the resulting viscous resin product was cured as in Example I, a cured product having the following properties was obtained: heat deflection temperature (HDT) of 174, tensile strength of 10,308 p.s.i., percent elongation of 5.5 and a Barcol hardness (Barcol Impressor Model GYZJ-935) of 61. An impregnated glass roving prepared as in the examples above showed excellent tack.

Examples IX–X

Compositions were prepared in a pilot plant from the same resins and guanamines and in a similar manner as those of Examples I and V, respectively. Solutions of these resins (50% solids in 75:25 methyl ethyl ketone and methyl Cellosolve) were used to impregnate fiber glass rovings, which impregnated rovings were tested according to Aerojet General Specification WS1028A. Results are set forth in the following Table II.

It is to be understood that the invention is not to be limited to the exact details of operation or the exact compositions and materials described, as equivalents will be apparent to those skilled in the art and the invention is to be limited only by the scope of the appended claims.

The embodiments of the invention in which an exclusive property or privilege is claimed are defined as follows:

1. The process of preparing a curable composition from at least one epoxy resin having terminal epoxide groups and an epoxy equivalent weight of from about 140 to about 2000 and a sufficient amount of a guanamine to cure said epoxy resin to an infusible and insoluble polymer, the weight ratio of the guanamine to the epoxy resin being in the range of about 5:95 to 75:25, comprising (I) reacting about 50 to 95% by weight of the epoxy resin with the guanamine, (II) terminating the reaction when about 5 to 90% complete and (III) adding the remaining 5 to 50% by weight of the epoxy resin to the partial reaction product, said guanamine being selected from the group consisting of

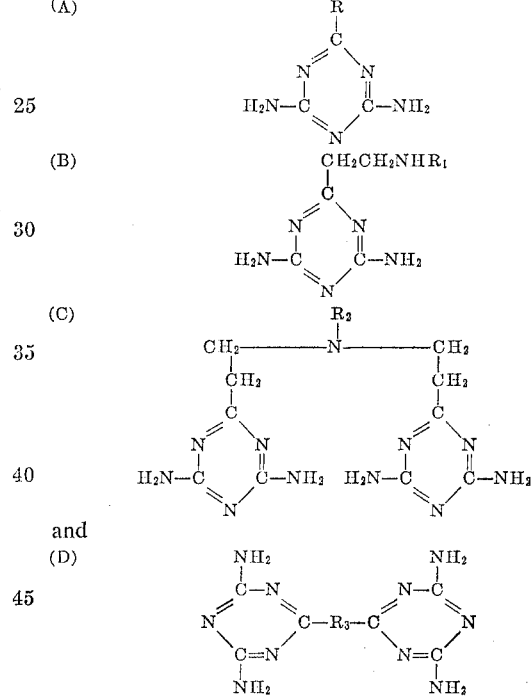

TABLE II

| Composition of— | Glass Type Roving | Width Roving (inches) | Resin content (wt. percent) | Volatiles (wt. percent) | Cured Structure | | | | |
|---|---|---|---|---|---|---|---|---|---|
| | | | | | Ultimate* Tensile Strength (p.s.i.) | Shear (p.s.i.) | | | |
| | | | | | | Room Temp. | 250° F. | 300° F. | After 2 Hrs. $H_2O$ Boiling |
| Exp. IX | S 994 | 0.077 | 18.9 | 0.4 | 463,250 | 7,120 | 4,340 | 2,890 | 5,960 |
| Exp. X | S 994 | 0.077 | 20.8 | 0.48 | 507,000 | 7,280 | 4,080 | 2,380 | 7,520 |
| Exp. IX | 801 | 0.077 | 18.2 | 0.38 | 310,500 | 8,240 | 4,230 | 3,110 | 6,860 |
| Exp. X | 801 | 0.077 | 21.2 | 0.34 | 332,250 | 8,683 | 5,000 | 3,260 | 7,300 |

*Ultimate tensile strength is based on glass area.

The above data show that the compositions and impregnated glass fiber rovings of the present invention are particularly useful in the preparation of filament wound structures. The impregnated glass fibers of Examples IX and X have the same good tack properties of those of Examples I and V.

The stability of the compositions of the present invention is outstanding. Thus solvent solutions of the type of Examples IX and X were stored for over 7 months at 120° F. without appreciable change. The impregnated fiber glass rovings have been stored for over 3 months at 75° F. and still show no significant change in tack or other properties.

where R is selected from the group consisting of the phenyl radical and aliphatic hydrocarbon groups containing 4 to about 21 carbon atoms, $R_1$ and $R_2$ are aliphatic hydrocarbon groups containing 4 to about 21 carbon atoms and $R_3$ is a divalent hydrocarbon group containing 4 to about 42 carbon atoms.

2. The process of claim 1 wherein the guanamine has the formula

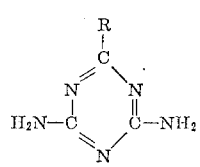

where R is selected from the group consisting of the phenyl radical and aliphatic hydrocarbon groups containing 4 to about 21 carbon atoms.

3. The process of claim 1 wherein the guanamine has the formula:

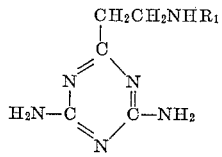

where $R_1$ is an aliphatic hydrocarbon group containing 4 to about 21 carbon atoms.

4. The process of claim 1 wherein the guanamine has the formula:

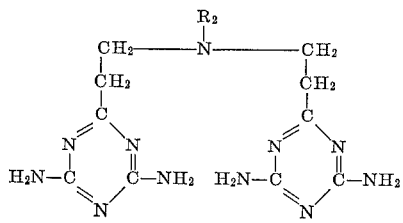

where $R_2$ is an aliphatic hydrocarbon group containing 4 to about 21 carbon atoms.

5. The process of claim 1 wherein the guanamine has the formula:

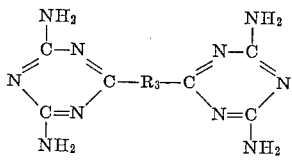

where $R_3$ is a divalent hydrocarbon group containing 4 to about 42 carbon atoms.

6. The process of claim 1 wherein about 70 to 95% by weight of the epoxy resin is reacted with the guanamine in step (I) and about 5 to 30% by weight of the epoxy resin is added in step (III).

7. The process of claim 1 wherein the remainder of the epoxy resin is added at the time of terminating the reaction.

8. The process of claim 1 wherein at least two epoxy resins are employed.

9. The process of claim 8 wherein a portion of the epoxy resin is an epoxy-novolac resin and another portion is an epoxy resin prepared by reacting epichlorohydrin with a polyhydric phenol.

10. The process of claim 1 wherein the epoxy resin added in step (III) is a liquid epoxy resin.

11. The process of claim 2 wherein R is an aliphatic hydrocarbon group containing 4 to about 21 carbon atoms.

12. The curable composition prepared by the process of claim 1.

13. The curable composition prepared by the process of claim 2.

14. The curable composition prepared by the process of claim 8.

15. The curable composition prepared by the process of claim 9.

16. The curable composition prepared by the process of claim 10.

17. A fibrous material impregnated with the curable composition of claim 12.

18. The product of claim 17 wherein the fibrous material is fiber glass.

19. A solvent solution of the curable composition of claim 12.

20. The solution of claim 19 wherein the solvent is selected from the group consisting of alkyl ethers of ethylene glycol, methyl ethyl ketone, acetone, trichloroethylene and mixtures thereof.

References Cited by the Examiner
UNITED STATES PATENTS

| | | | |
|---|---|---|---|
| 2,806,016 | 9/1957 | Schwarzer | 260—47 |
| 2,901,461 | 8/1959 | Auerbach et al. | 260—47 |
| 2,906,723 | 9/1959 | Reese | 260—47 |
| 2,928,811 | 3/1960 | Belanger | 260—47 |
| 3,030,247 | 4/1962 | Schurb | 260—47 |
| 3,051,681 | 8/1962 | Partansky | 260—830 |

MURRAY TILLMAN, *Primary Examiner.*

J. C. BLEUTGE, *Assistant Examiner.*